(12) United States Patent
Antonov et al.

(10) Patent No.: US 11,956,197 B2
(45) Date of Patent: Apr. 9, 2024

(54) METHOD FOR PROVIDING AN EMAIL USER EXPERIENCE BY CONTACTS INSTEAD OF FOLDERS

(71) Applicants: Andrey Antonov, Rostov-on-Don (RU); Dmitry Andrushkevich, Rostov-on-Don (RU)

(72) Inventors: Andrey Antonov, Rostov-on-Don (RU); Dmitry Andrushkevich, Rostov-on-Don (RU)

(*) Notice: Subject to any disclaimer, the term of this patent is extended or adjusted under 35 U.S.C. 154(b) by 0 days.

(21) Appl. No.: 17/475,157

(22) Filed: Sep. 14, 2021

(65) Prior Publication Data

US 2022/0158962 A1 May 19, 2022

Related U.S. Application Data

(60) Provisional application No. 63/114,258, filed on Nov. 16, 2020.

(51) Int. Cl.
| | |
|---|---|
| *H04L 51/42* | (2022.01) |
| *G06F 40/289* | (2020.01) |
| *G06Q 10/107* | (2023.01) |
| *H04L 51/212* | (2022.01) |

(52) U.S. Cl.
CPC ............ *H04L 51/42* (2022.05); *G06F 40/289* (2020.01); *G06Q 10/107* (2013.01); *H04L 51/212* (2022.05)

(58) Field of Classification Search
CPC ..... H04L 51/42; H04L 51/212; G06F 40/289; G06Q 10/107
See application file for complete search history.

(56) References Cited

U.S. PATENT DOCUMENTS

| | | | |
|---|---|---|---|
| 2005/0004989 A1* | 1/2005 | Satterfield | G06F 3/0481 709/206 |
| 2006/0168006 A1* | 7/2006 | Shannon | H04L 51/212 709/206 |
| 2007/0061306 A1* | 3/2007 | Pell | G06F 16/334 |
| 2009/0030933 A1* | 1/2009 | Brezina | H04L 51/42 707/999.102 |
| 2013/0124648 A1* | 5/2013 | Kallayil | G06Q 10/107 709/206 |
| 2015/0281144 A1* | 10/2015 | Staerk | H04L 51/046 715/752 |
| 2017/0093783 A1* | 3/2017 | Sachidanandam | H04L 51/226 |
| 2019/0364006 A1* | 11/2019 | Hu | G06Q 10/10 |

* cited by examiner

*Primary Examiner* — Suraj M Joshi
*Assistant Examiner* — Jaren Means
(74) *Attorney, Agent, or Firm* — White-Welker & Welker, LLC; Matthew T. Welker, Esq.

(57) ABSTRACT

An email solution defined by three panels, referred to as the left/first panel, the middle/second panel and the right/third panel when viewed on a display screen from a user perspective scanning or viewing left to right across a display screen. The left/first panel illustrates primary emails, promo & robots, special folders, contacts, and contact groups. A middle/second panel shows all conversation emails related to the item selected in left/first panel. A right/third panel shows a message thread defined as an ordered set of related emails, related to the email selected in the middle panel. The right/third panel shows both received and sent emails like the middle panel. A main horizontal header and toolbar provides selectable buttons for creating a new email, sorting the middle/second panels list of emails by one or more characteristics.

20 Claims, 22 Drawing Sheets

PRIOR ART

FROM: Andrey Antonov <simplecode80@gmail.com>
DATE: December 17, 2015 12:30

Dima,

I have deactivated rule 410 in CodeTranslationRules table since:
1) it cannot be useful - all logic is in code
2) it raises error because indRiskRated field is not in Location table, it causes ex I am going to add exception handling logic to function ProcessMappingPass2 to Regards,
Andrey FROM: Andrey Antonov <simplecode80@gmail.com>
DATE: December 17, 2015 18:57

Hi Dima,

Yes, I can. I will start right now and will let you know how it is going later.

Regards,
Andrey

FROM: Dmitry Mnushkin <dmnushkin@treefrogconsulting.com>
DATE: December 17, 2015 18:31

Hi Andrey,

I have assigned a couple of high-priority bugs to you. Please let me know if you Thanks,
Dima.

<winmail.dat>

Roman,

It sounds good to publish these changes tomorrow.

Sorry I didn't see your emails as they were sent to my gmail address. Can you pls update my email address in your contact list to vihar@sierrainteractive.com?

Thanks.

On Tue, Nov 10, 2020 at 1:41 PM Roman Kharin <romankharin@sierrainteractive.com> wrote:
> Vihar,
>
> That sounds good. We will publish tomorrow.
> In the meantime, I'll do additional tests on the local machine.
>
> Thanks.

Figure 12

PRIOR ART

Figure 22

METHOD FOR PROVIDING AN EMAIL USER EXPERIENCE BY CONTACTS INSTEAD OF FOLDERS

FEDERALLY SPONSORED RESEARCH

Not Applicable

SEQUENCE LISTING OR PROGRAM

Not Applicable

TECHNICAL FIELD OF THE INVENTION

The present invention relates generally to email applications. More specifically, the present invention relates to overcoming current display experience limitations which commonly cause users difficulty in locating, sorting, and navigating multiple emails from multiple senders for a plurality of issues.

BACKGROUND OF THE INVENTION

For many, email accounts have become less communication space and more of an endless pile of irrelevant email. A social shift toward a more electronic life from a more tactile way of life has only made digging through now electronic coupons, social media invites, newsletters, and school assignments more difficult, frustrating, and time consuming. A lot of important conversations have shifted to text, social medial applications like WHATSAPP, SNAPCHAT, and FACEBOOK, but that has not done away with email or made not responding any less impolite.

Inboxes have become to-do lists other people get to make. In recent years, users handed over a lot of control to black-box algorithms and advertising companies like GOOGLE and MICROSOFT. GMAIL, with more than 1.5 billion accounts, and have used their scale to make important inroads against spam and security threats. But they have also focused on serving the lowest common denominator—no wonder most inboxes still just look like endless rows of text.

In theory, AI can help surface what matters when most people don't have the time to organize inboxes themselves. In practice, the AI flunks just often enough to make email even more of a mess, leaving inboxes cluttered with stuff that is never read.

Therefore, what is needed is an email program with a user experience that enables users to quickly and easily identifying contacts, themes, and emails that are identified as important to them, and to have a filtering tool that quickly and reliable identifies promotional and robot emails, separating them, while also providing organizational and sorting features that are aligned with how a user want to experience email usage.

Definitions

Unless stated to the contrary, for the purposes of the present disclosure, the following terms shall have the following definitions:

"Application software" is a set of one or more programs designed to carry out operations for a specific application. Application software cannot run on itself but is dependent on system software to execute. Examples of application software include MS Word, MS Excel, a console game, a library management system, a spreadsheet system etc. The term is used to distinguish such software from another type of computer program referred to as system software, which manages and integrates a computer's capabilities but does not directly perform tasks that benefit the user. The system software serves the application, which in turn serves the user.

The term "app" is a shortening of the term "application software". It has become very popular and in 2010 was listed as "Word of the Year" by the American Dialect Society "Apps" are usually available through application distribution platforms, which began appearing in 2008 and are typically operated by the owner of the mobile operating system. Some apps are free, while others must be bought. Usually, they are downloaded from the platform to a target device, but sometimes they can be downloaded to laptops or desktop computers.

"API" In computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising each other.

The Domain Name System (DNS) is a hierarchical distributed naming system for computers, services, or any resource connected to the Internet or a private network. It associates various information with domain names assigned to each of the participating entities. Most prominently, it translates domain names, which can be easily memorized by humans, to the numerical IP addresses needed for the purpose of computer services and devices worldwide. The Domain Name System is an essential component of the functionality of most Internet services because it is the Internet's primary directory service.

"Email" or "electronic messages" is defined as a means or system for transmitting messages electronically as between computers or mobile electronic devices on a network.

"Email Client" or more formally mail user agent (MUA) is a computer program used to access and manage a user's email. A web application that provides message management, composition, and reception functions is sometimes also considered an email client, but more commonly referred to as webmail.

"GUI". In computing, a graphical user interface (GUI) sometimes pronounced "gooey" (or "gee-you-eye")) is a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces (CLIs), which require commands to be typed on the keyboard.

The Hypertext Transfer Protocol (HTTP) is an application protocol for distributed, collaborative, hypermedia information systems.[1] HTTP is the foundation of data communication for the World Wide Web. Hypertext is structured text that uses logical links (hyperlinks) between nodes containing text. HTTP is the protocol to exchange or transfer hypertext.

The Internet Protocol (IP) is the principal communications protocol in the Internet protocol suite for relaying datagrams across network boundaries. Its routing function enables internetworking, and essentially establishes the Internet.

An Internet Protocol address (IP address) is a numerical label assigned to each device (e.g., computer, printer) participating in a computer network that uses the Internet Protocol for communication. An IP address serves two principal functions: host or network interface identification and location addressing.

An Internet service provider (ISP) is an organization that provides services for accessing, using, or participating on the Internet.

A "mobile app" is a computer program designed to run on smartphones, tablet computers and other mobile devices, which the Applicant/Inventor refers to generically as "a computing device", which is not intended to be all inclusive of all computers and mobile devices that are capable of executing software applications.

A "mobile device" is a generic term used to refer to a variety of devices that allow people to access data and information from wherever they are. This includes cell phones and other portable devices such as, but not limited to, PDAs, Pads, smartphones, and laptop computers.

A "module" in software is a part of a program. Programs are composed of one or more independently developed modules that are not combined until the program is linked. A single module can contain one or several routines or steps.

A "module" in hardware, is a self-contained component.\

A "software application" is a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

A "software module" is a file that contains instructions. "Module" implies a single executable file that is only a part of the application, such as a DLL. When referring to an entire program, the terms "application" and "software program" are typically used. A software module is defined as a series of process steps stored in an electronic memory of an electronic device and executed by the processor of an electronic device such as a computer, pad, smart phone, or other equivalent device known in the prior art.

A "software application module" is a program or group of programs designed for end users that contains one or more files that contains instructions to be executed by a computer or other equivalent device.

Spam or SPAM commonly refers to: Spamming, unsolicited or undesired electronic messages; Email spam, unsolicited, undesired, or illegal email messages; spam messages, unsolicited, undesired, or illegal messages in general (private messages on websites, SMS, messenger etc.

A "computer system" or "system" consists of hardware components that have been carefully chosen so that they work well together and software components or programs that run in the computer. The main software component is itself an operating system that manages and provides services to other programs that can be run in the computer. The complete computer made up of the CPU, memory, and related electronics (main cabinet), all the peripheral devices connected to it and its operating system. Computer systems fall into two categories: clients and servers.

UI (User Interface) design software focuses on the design interface and how a user interacts with it, UX (User Experience) emphasizes a user's experience as they use the product or service.

UI tools give designers what they need to design accurate hi-fi wireframes, mockups, and prototypes and render minimally viable products.

A UX designer is concerned with the entire process of acquiring and integrating a product, including aspects of branding, design, usability, and function. It is a story that begins before the device is even in the user's hands.

URL is an abbreviation of Uniform Resource Locator (URL), it is the global address of documents and other resources on the World Wide Web (also referred to as the "Internet").

A "User" is any person registered to use the computer system executing the method of the present invention.

In computing, a "user agent" or "useragent" is software (a software agent) that is acting on behalf of a user. For example, an email reader is a mail user agent, and in the Session Initiation Protocol (SIP), the term user agent refers to both end points of a communications session. In many cases, a user agent acts as a client in a network protocol used in communications within a client-server distributed computing system. In particular, the Hypertext Transfer Protocol (HTTP) identifies the client software originating the request, using a "User-Agent" header, even when the client is not operated by a user. The SIP protocol (based on HTTP) followed this usage.

A "web application" or "web app" is any application software that runs in a web browser and is created in a browser-supported programming language (such as the combination of JavaScript, HTML, and CSS) and relies on a web browser to render the application.

SUMMARY OF THE INVENTION

The present invention is a software solution and business method that implements a novel and non-obvious user experience design for providing an email solution where a three panel layout that defines the UX design created by the inventors.

The user display of the present invention is defined by three panels, referred to as the left/first panel, the middle/second panel and the right/third panel when viewed on a display screen from a user perspective scanning or viewing left to right across a display screen.

The left/first panel illustrates primary emails, promo & robots, special folders, contacts, and contact groups. The present invention discloses a novel and non-obvious method and process for displaying emails, specifically where contacts and contact groups are placed into a left/first panel in a three panel layout, which distinguishes between human and robot email senders.

A middle/second panel shows all conversation emails related to the item selected in left/first panel. Again, left/first panel items can be contacts mail, promo and robots, sent folder, draft folder, any number of special folders, as well as individually selected contacts, robots, and custom groups/lists. Upon selection of a left/first panel item, the selection is received by the second panel and the second panel is sent emails grouped by theme for the selected left/first panel item and then displayed in the middle/second panel.

A right/third panel shows a message thread defined as an ordered set of related emails, related to the email selected in the middle panel. The right/third panel shows both received and sent emails like the middle panel.

A main horizontal header and toolbar is presented to the user via the display. This main horizontal header/toolbar provides selectable buttons for creating a new email, sorting the middle/second panels list of emails by those that have been "only read", have attachments, one or a one or more customized categories, those flagged or flagged in combination with one or more of the other filters selected, the other filters being "only read", with attachments, and categories, by period broken down by day, week, month, year, and selectable dates, as well as sent, received and all message types.

Messages can be sorted and/or grouped by: priority status; ready/unread; from/to; theme; no category setting, attachments, attachment size, date, and priority/pinning, and whether they are flagged or not flagged using a plurality of horizontally placed button controls located along the top header of the middle/second panel.

BRIEF DESCRIPTION OF THE DRAWINGS

The accompanying drawings, which are incorporated herein form a part of the specification, illustrate the present invention and, together with the description, further serve to explain the principles of the invention and to enable a person skilled in the pertinent art to make and use the invention.

FIG. 1 is a screen capture of the email software of the present invention illustrating the three panel user experience display.

FIG. 8 illustrates an example of an email message where the most current email text is shown, then a series of horizontal color lines represents the various messages in order of transmission/receipt between senders and receivers.

FIG. 9 illustrates how the present invention transforms a current email/thread structuring to give a more detailed, denotation of emails in a thread or series.

FIG. 11 illustrates an example of an email thread in the right/third panel of the present invention where each white block is a unique message.

FIG. 12 illustrates an example of how each unique message originally looks in other email clients known in the prior art.

FIG. 22 is a screenshot illustrating the advanced search window as taught by the present invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized, and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the present invention.

The Inventor(s) have developed a software solution and business method that implements a unique idea in UX (User Experience) design for providing an email solution.

Figure 1:
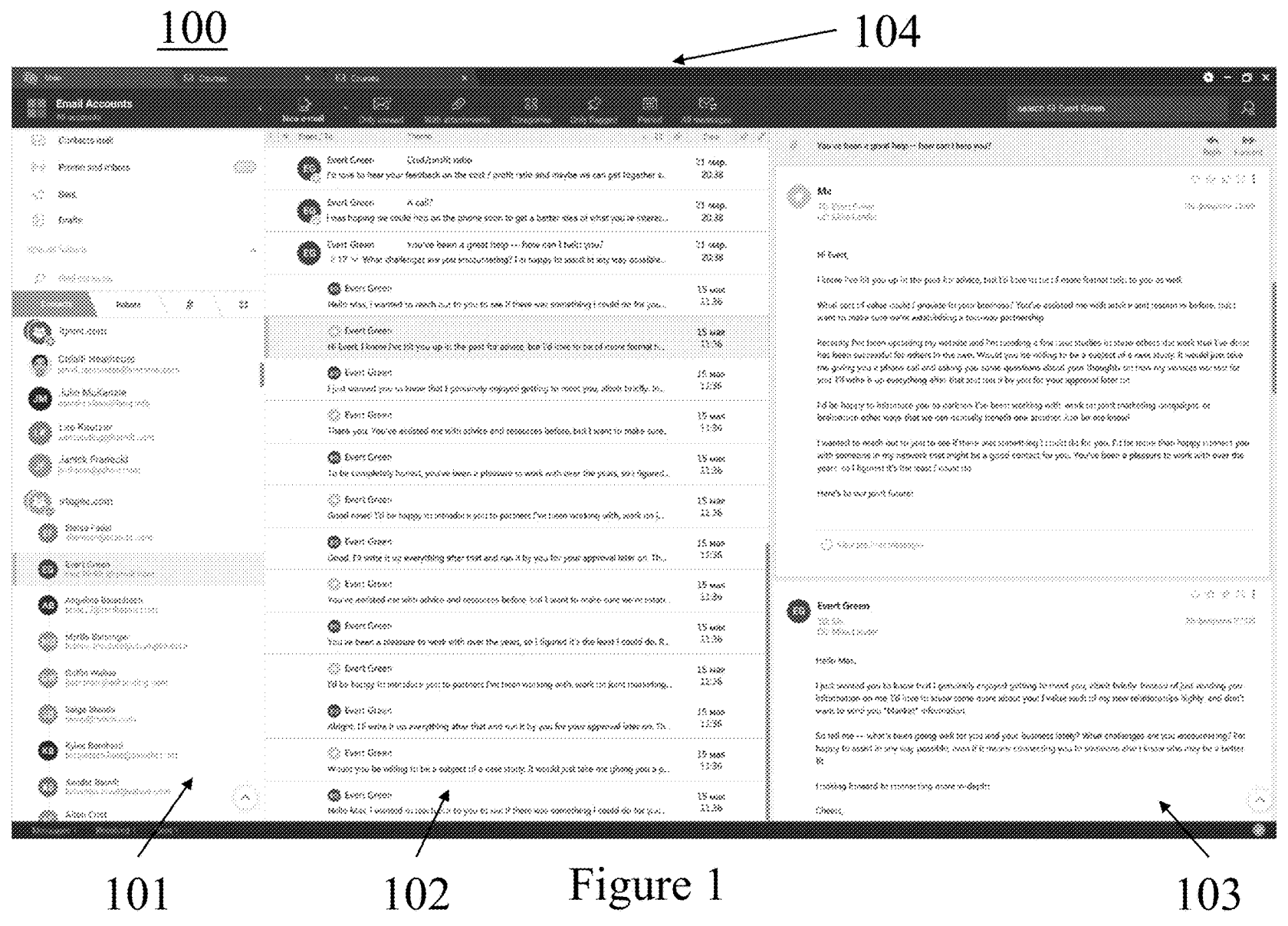

Now referring to FIG. 1, a screen capture 100 of the software and business method user interface is illustrated which depicts the three panel layout that defines the UX design created by the inventors.

The user display of the present invention is defined by three panels, referred to as the left/first panel 101, the middle/second panel 102, and the right/third panel 103 when viewed on a display screen from a user perspective scanning or viewing left to right across a display screen.

Figure 2:
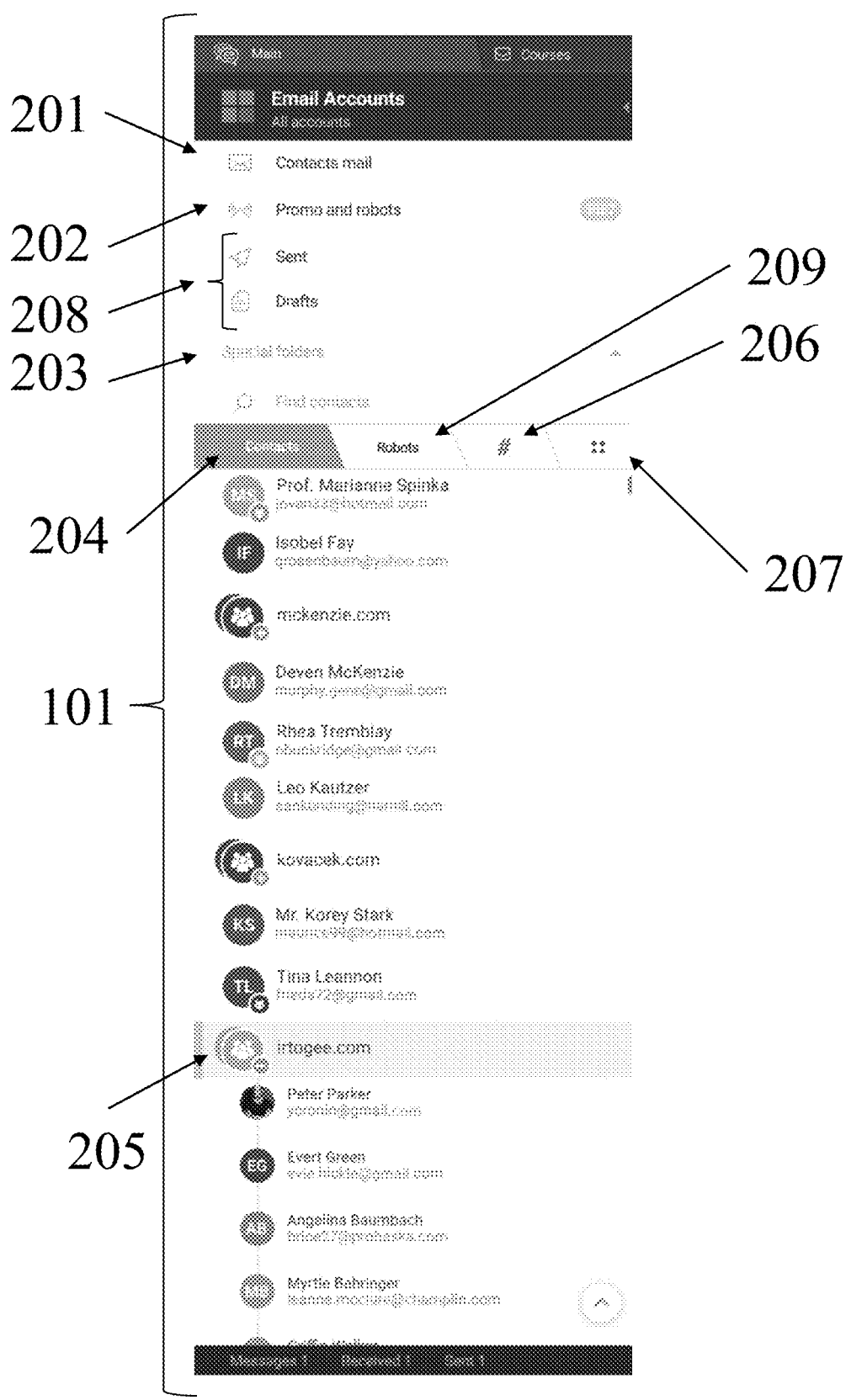
FIG. 2 is a screen capture of the email software of the present invention illustrating the left/first panel user experience display.

As illustrated in more narrowed detail in FIG. 2, the left/first panel 101 illustrates primary emails 201, promo & robots 202, special folders 203, contacts 204, and contact groups 205. The left/first panel 101 also includes important themes. In the illustrated embodiment, when user clicks on "#" symbol displayed on FIG. 4. Symbol "#" on FIG. 2 (206) just switches left panel view to displaying selected themes ("starred" with symbol #).

Figure 3:
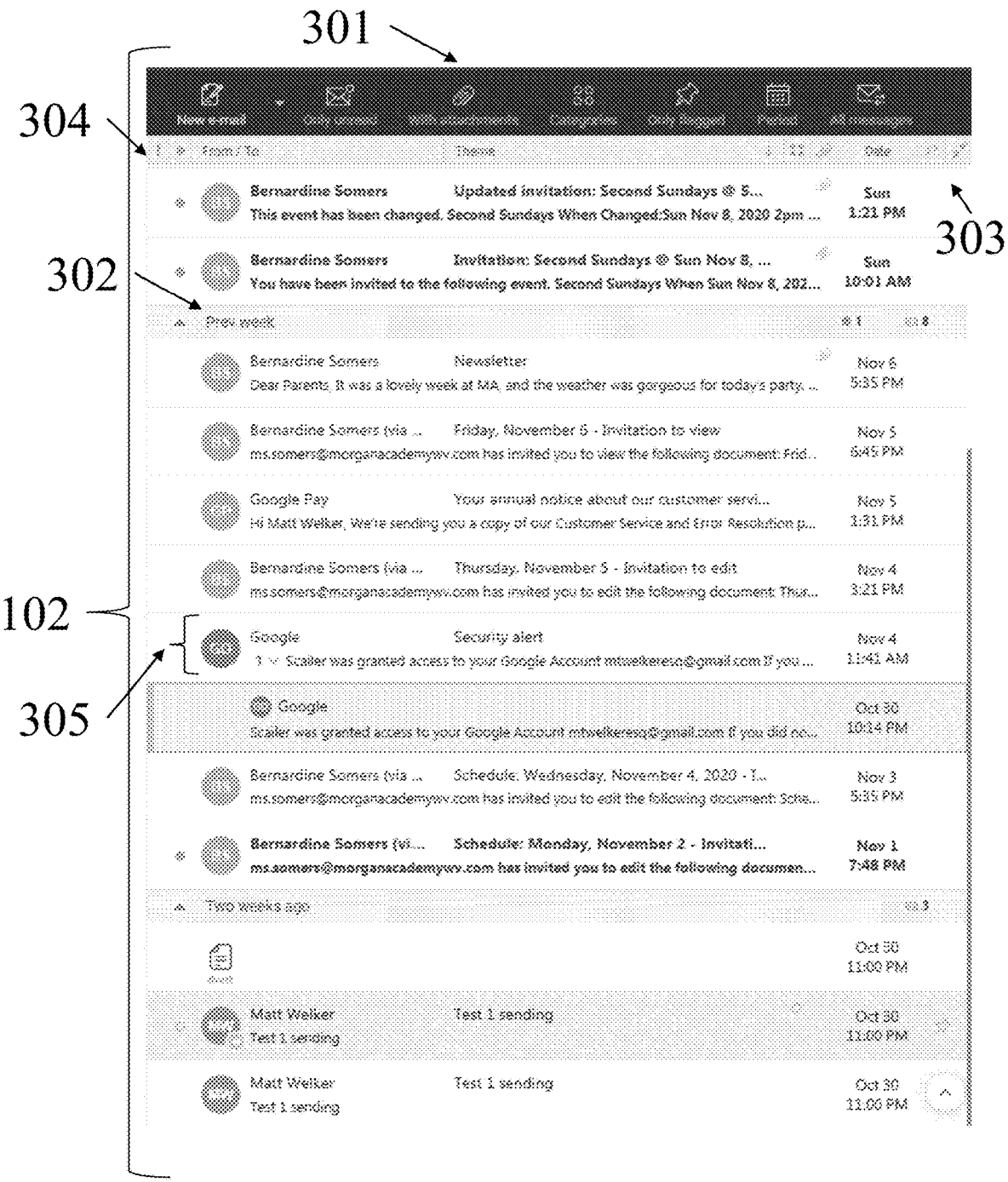
FIG. 3 is a screen capture of the email software of the present invention illustrating the second/middle panel user experience display.
Figure 4:
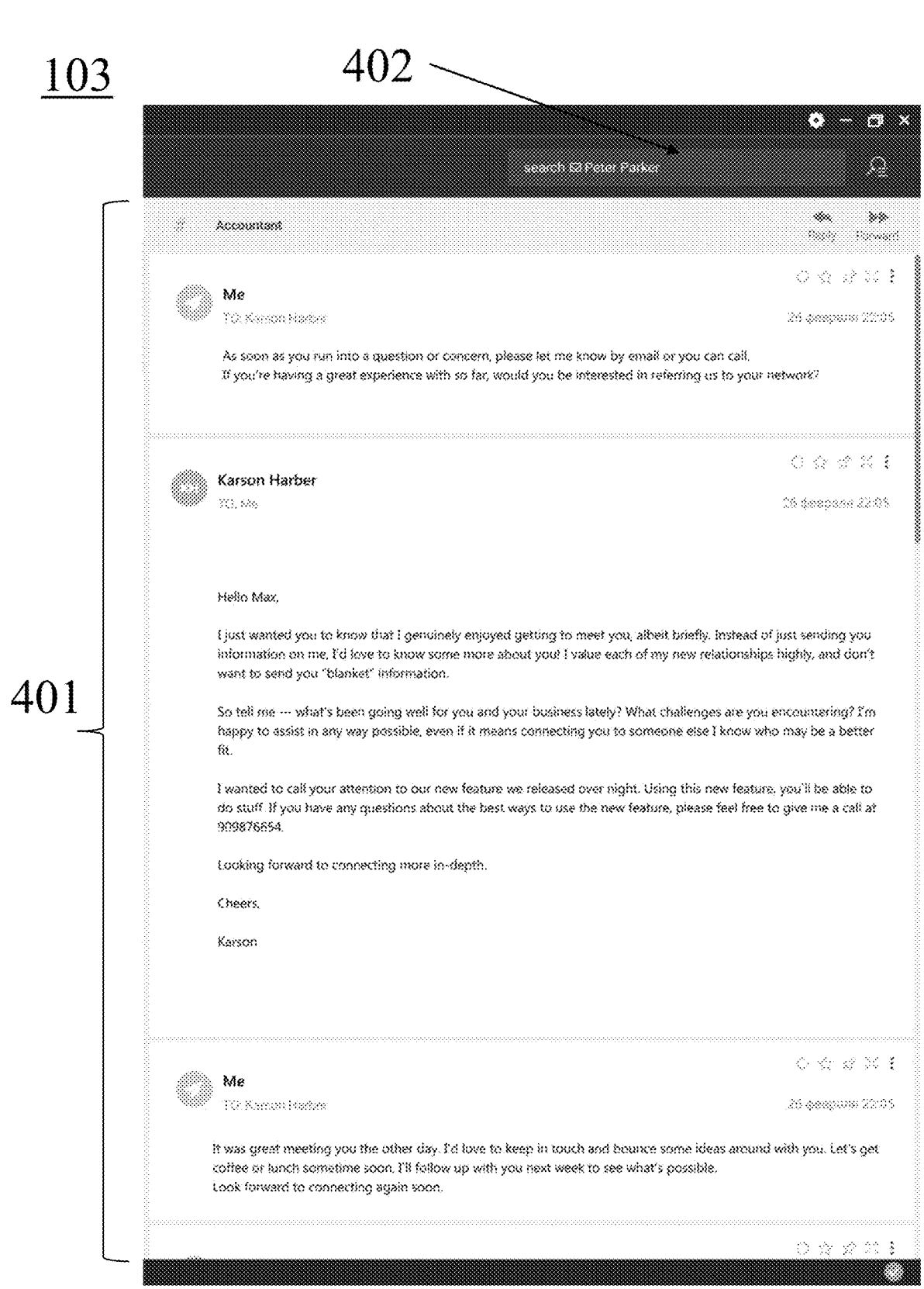
FIG. 4 is a screen capture of the email software of the present invention illustrating the right/third panel user experience display.

Additionally, a four dot square on the left panel 207 provides means for switching a left panel view to displaying categories. In order to set or clear category of the message, a user should click a circle on the middle panel as shown in FIG. 3 or the right panel as shown in FIG. 4.

Primary emails are those emails received by a "contact", which is an email sender that is already known to the recipient/user and it highly likely to be an email the user wants to view, read, and respond to as it has importance and value to the user. A "contacts mail" mail inbox or folder 201 is presented in the left/first panel 101 to assist in organization and sorting for a user and the user's experience. Primary email shows all emails from contacts and some important notifications from robots.

Figure 7:
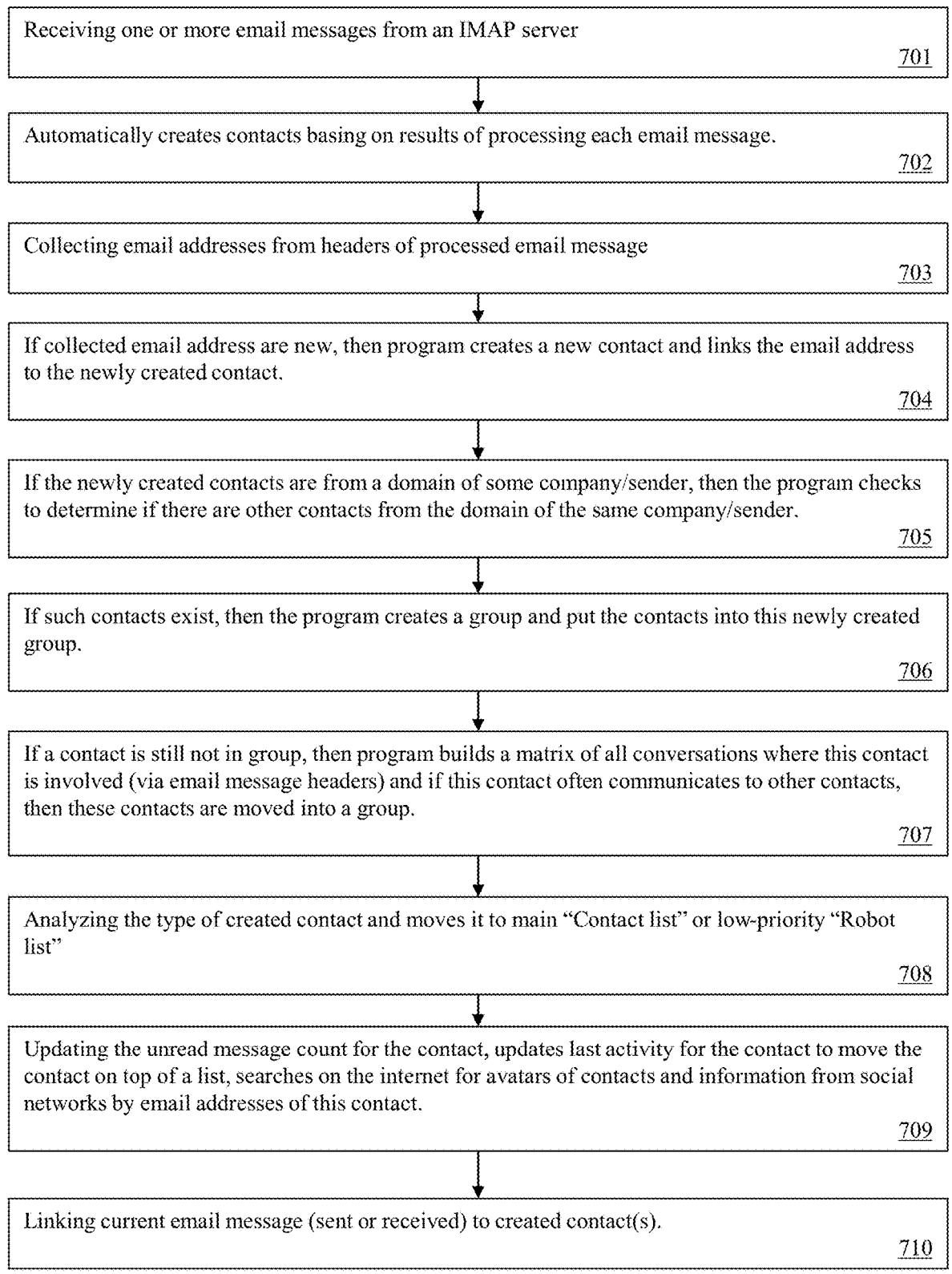
FIG. 7 is a flow chart illustrating a high-level description of an algorithm for creating, organizing, and sorting contacts from email messages.

The present invention teaches and uses an algorithm for creating contacts. Now referring to FIG. 7, a flow chart illustrating a high-level description of an algorithm for creating, organizing, and sorting contacts from email messages is illustrated.

In a first step, the program receives email messages from an IMAP server 701 and automatically creates contacts basing on results of processing each email message 702. Next, the program collects email addresses from headers of a processed email message. As illustrated, block 703 is part of block 702. Block 703 illustrates the location where the app takes information from in order to create a contact 702. If collected email address are new, then program creates a new contact and links the email address to the newly created contact. 704. If the newly created contacts are from a domain of some company/sender, then the program checks to determine if there are other contacts from the domain of the same company/sender 705. If such contacts exist, then the program creates a group and put the contacts into this newly created group 706.

If a contact is still not in group, then program builds a matrix of all conversations where this contact is involved (via email message headers) and if this contact often communicates to other contacts, then these contacts are moved into a group 707.

Next the program analyzes the type of created contact and moves it to main "Contact list" or low-priority "Robot list" 708. In a subsequent step, the program updates the unread message count for the contact, updates last activity for the contact to move the contact on top of a list, searches on the internet for avatars of contacts and information from social networks by email addresses of this contact 709. Finally, the program links current email message (sent or received) to created contact(s) 710.

In order to distinguish human emails from robot emails and also in order to distinguish important robot emails from generic robot emails, an algorithm is applied that analyzes the text of an email, words in the email, sentences in the email, phrases in the email and, based on findings, makes a decision whether this email is from a human or robot and, if this email is an important email from a robot that should be displayed to a user.

Important emails from robots are defined as: important notifications from GOOGLE about a security alert, an expiration notification from GODADDY, or in general email notifications from verified senders on a select list of topics that generally require a receiver to take action or to be aware of such a notice.

A promotional email is an email sent to inform the email list of any new or existing products or services. Promotional emails are intended to get the word out about special offers, limited time deals, or exclusive content. An E-mail Robot consists of tools for sending bulk letters via e-mail. These are the same letters a mass mail marketer would print and mail in an envelope, just sent electronically. The software and method of the present invention provides for a promo and robot main folder which identifies and groups robot emailers as promotions emails, removing such clutter from the contacts email and separating promotion and robot emails from contact emails automatically for the user. The promotion and robot's folder collects and shows all promo emails and emails from robots.

Figure 5:
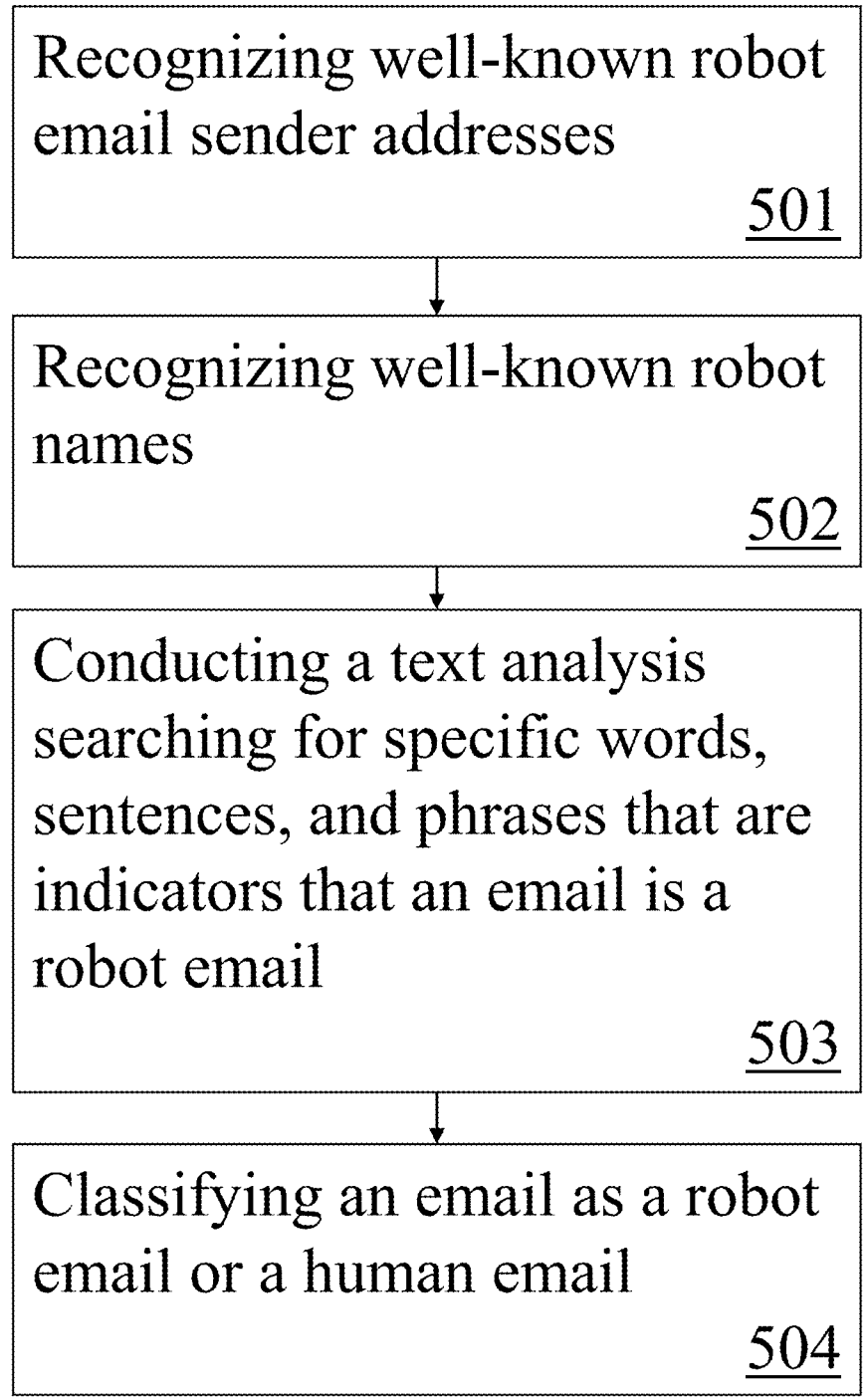
FIG. 5 is a flow chart illustrating the email analysis algorithm taught by the present invention for making determinations on whether and email is a robot email or a human email.

Now referring to FIG. 5, an algorithm for identifying and recognizing emails sent by robots is used and taught by the present invention and consists of several steps. In a first step, the algorithm recognizes well-known robot email sender addresses 501, such as notification@github.com. In a second step the algorithm recognizes well-known robot names 502, such as notification@, no-reply@. In a third step the algorithm conducts a text analysis searching for specific words, sentences, and phrases that are indicators that an email is a robot email 503. Finally, in a fourth step, depending on steps above, the algorithm classifies an email as a robot email or a human email 504.

Also, under the contacts portion 204 of the left/first panel 101 standard email folders for sent emails and draft emails are found 208.

Special Folders 203 are similar to any email software or program known in the current prior art in that a user can create and add a plurality of folders for grouping emails based on various topics, the most common being flagged or important emails, spam or junk emails, and those that are set to be deleted and moved to a trash folder which can perform immediate or period deletion of emails from the application of the present invention and or from a remote server in combination with the local application.

Contacts 204 are created from email conversations only. A simple algorithm is used to create contacts where any sender is a contact.

Figure 6:
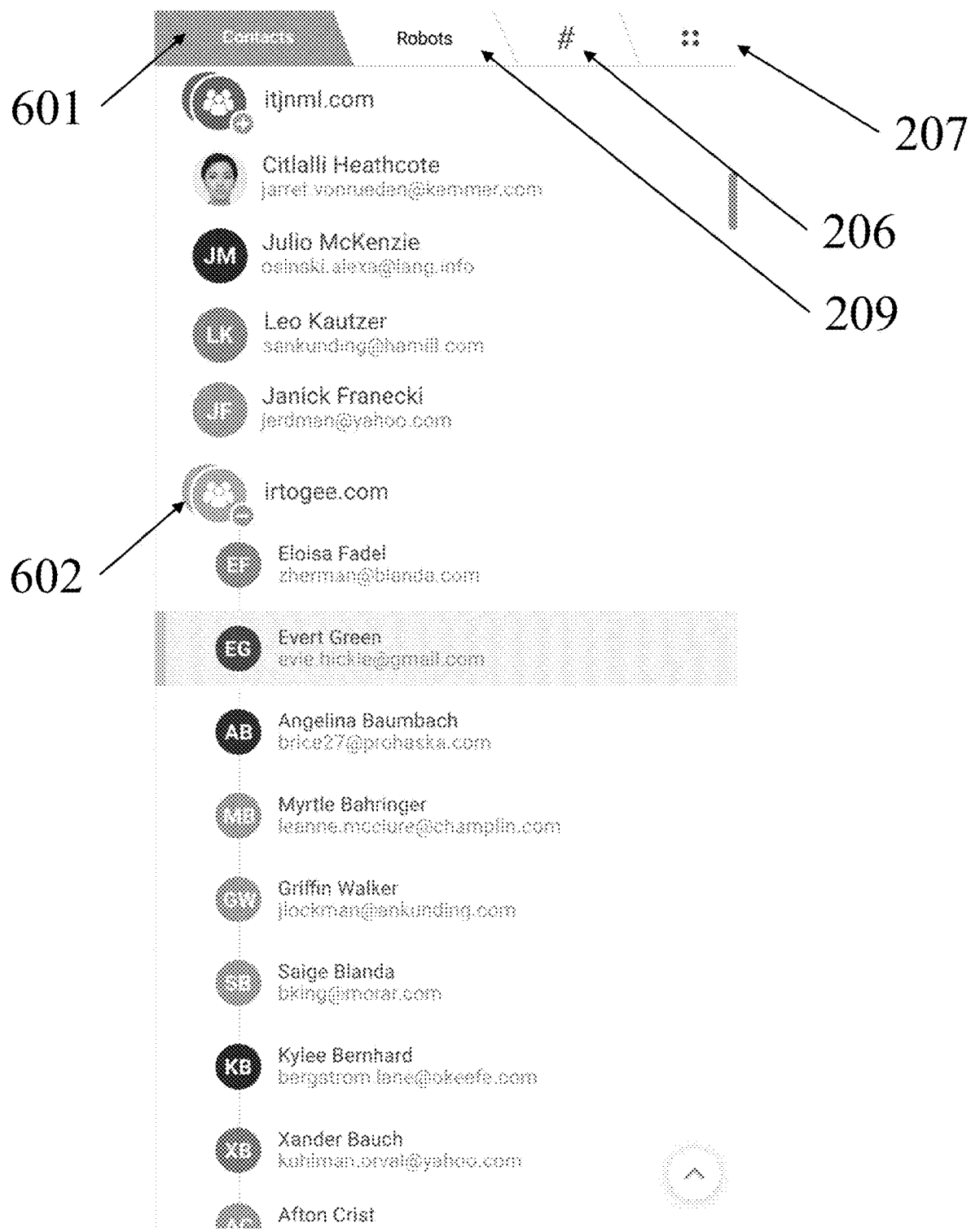
FIG. 6 is a screen capture of the email software of the present invention illustrating the left/first panel user experience display where a group is created under a user for similar users with the same domain email address.

Now referring to FIG. 6, generally, contacts groups 601 are created automatically from conversations and domains by a special private algorithm and users do not need to create groups manually although the present invention allows for manual group creation. The present invention teaches creating groups automatically when a user receives messages from two or more contacts of the same domain, for example if a user receives emails from two emails at irtogee.com 602, then a group will be created which consists of the two emails from irtogee.com and the contact is created automatically. Contact groups are created from conversations only. Contacts from a single domain are grouped.

Contacts that have a common conversation are grouped. For example, all contacts in a single email thread/theme are joined in a contact group. When a contact is selected by a user from the contacts list, emails received from that contact are loaded as a list in the middle/second panel for review.

A Robots tab 209 also includes for identifying contacts that are determined to be robots which send promotions or mass marketing type emails. This is helpful so users can quickly find emails received by a specific promotional or other robot sender for such reasons a reviewing coupons or other offers which are loaded as a list in the middle/second panel for review.

An algorithm for determining "important notifications from robots" is taught by the present invention as previously discussed and illustrated in FIG. 5. The algorithm teaches where in general email notifications from verified senders on a select list of topics that generally require a receiver to take action or to be aware of such a notice are typically determined to be from human senders. Additionally, the algorithm teaches and enables the identification and usage of other factors that are specifically used to identify and note emails with characteristics generally associated with those generated and sent by robots.

In fact, same module and algorithm is used to determine robot emails, important robot emails, or human emails. According to FIG. 5, robot emails, important robot emails, or human emails are different by specific domains, names, sentences, and phrases that analyzed.

Finally, one or more custom groups can be created by the user. Custom groups can be color coded and named by a user for custom appearance and application. Additionally, the order of application for custom categories can be manipulated by a user for appearance purposed in the left/first panel 101. With this feature, a user can create custom contact groups for quickly responding to entire groups of contacts as well as locating emails by senders of the group. Emails received from a group or as part of a custom contacts group are loaded as a list in the middle/second panel 102 for review.

The present invention thus allows for sorting and viewing emails and email lists based on contacts, promotional, and robot senders, as well as custom contacts in the same manner as a user would use to view an entire inbox, spam, sent, or other typical custom email folder. This quick sorting and display save time and is more efficient and accurate for the user compared to simply using a search tool for keywords or sender/recipient names or email address, or subject matter keywords, all of which are commonly found in email software products currently known in the prior art which provided less efficiently and organization to a user.

Additional advantages of the present invention over the prior art are that the present invention enables a fast search of all emails and history of communication with a particular person (contact). A fast search of other contacts that are related to particular person (group of contacts) can also be done readily and easily. Finally, unlike prior art solutions, a user does not need to create one or more IMAP folders manually in order to sort out their inbox because automatic contacts and groups cover that need. In practice, IMAP folders are almost always created by users to function as if IMAP folders would be contacts or contact groups.

Now referring to FIGS. 1 and 3, the middle/second panel 102 shows all conversation emails related to the item selected in left/first panel 101. Again, left/first panel 101 items can be contacts mail, promo and robots, sent folder, draft folder, any number of special folders, as well as individually selected contacts, robots, and custom groups/lists. Upon selection of a left/first panel 101 item, the selection is received by the second panel 102 and the second panel 102 is sent and received emails grouped by data or theme for the selected left/first panel 101 item and then displayed in the middle/second panel 102.

The main advantage of the middle/second panel 102 taught by the present invention over other prior art email applications is that the middle/second panel 102 taught by the present invention displays both sent and received emails so a user can see a history of emails against a particular contact. The middle/second panel 102 taught by the present invention allows a user to quickly determine/remind a user if the user forgot to send an email and/or an expected email is not received yet, which is quickly and easily accomplished because when a user clicks on a contact in the left/first panel 101, the middle/second panel 102 shows all related emails.

Now referring to FIG. 3, messages can be sorted and/or grouped by: priority status; ready/unread; from/to; theme; no category, attachments, attachment size, date, and priority/pinning, and whether they are flagged or not flagged using a plurality of horizontally placed button controls located along the top header of the middle/second panel 301.

When grouped by theme, messages can be expanded or collapsed and show related thread messages. When messages are grouped by date and other columns, but not theme, message groups are created as illustrated by the gray horizontal bar 302. Groups can then be expanded/collapsed. When messages are grouped by theme, each message represents a thread and specific messages can be expanded/collapsed from individual threads. Again, the gray horizontal bar 302 is still in place and groups/orders threads by date.

A collapse/expand button 303 located at the end of the tool bar 304 also provides the user the ability to expand and collapse emails by: contact, theme, category; attachment size ranges/groups and no attachment groups; day, showing the total number of emails each day as well as the number of emails for each contact by displaying a number next to a colored circle 305 corresponding to a specific contact for each selected sorting feature provided in the horizontal tool bar 301.

Now referring to FIGS. 1 and 4, the right/third panel 103 shows a message thread 401 defined as an ordered set of related emails, related to the email selected in the middle panel 102. The right/third panel 103 shows both received and sent emails itself, like the middle panel 103.

One advantage of the present invention is that the advanced search tool taught by the present invention is in a separate non-modal panel/window, so it does not lock the main application panel/window. Thus, the advanced search tool 402 which is displayed in the right/third window 103 does not cover the left/first panel 101 or the middle/second panel 103.

Finally, referring back to FIG. 1, a main horizontal header and toolbar 104 is presented to the user via the display. This main horizontal header/toolbar 104 provides selectable buttons for creating a new email, sorting the middle/second panels list of emails by those that have been "only read", have attachments, one or a one or more customized categories, those flagged or flagged in combination with one or more of the other filters selected, the other filters being "only read", with attachments, and categories, by period broken down by day, week, month, year, and selectable dates, as well as sent, received and all message types.

Figure 22:
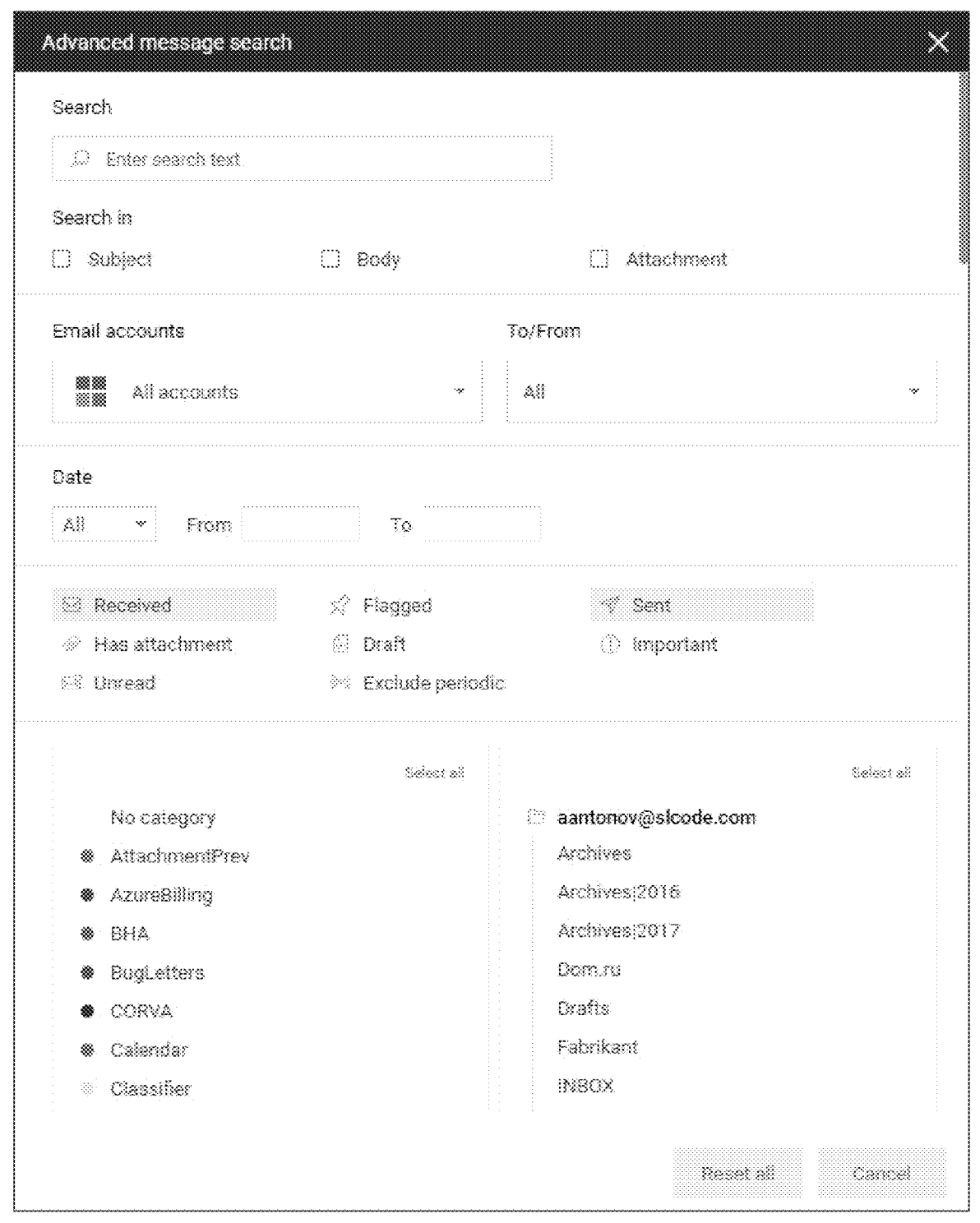

Now referring to FIG. 22, advanced searching of message can also be performed by searching text, limiting a text search to the subject, body, attachments, and any combination thereof, as well as one or more email accounts and sender and recipients over a date range, and further narrowing to those received, flagged, sent, having attachments, drafts, marked as important, unread, and an excluding periodic.

The present invention also teaches a method of email transformations where the system analyzes and transforms email content into a flat readable view with a gray splitter compared to the traditional formatting for threads and email trails currently used in the prior art.

Figure 8:
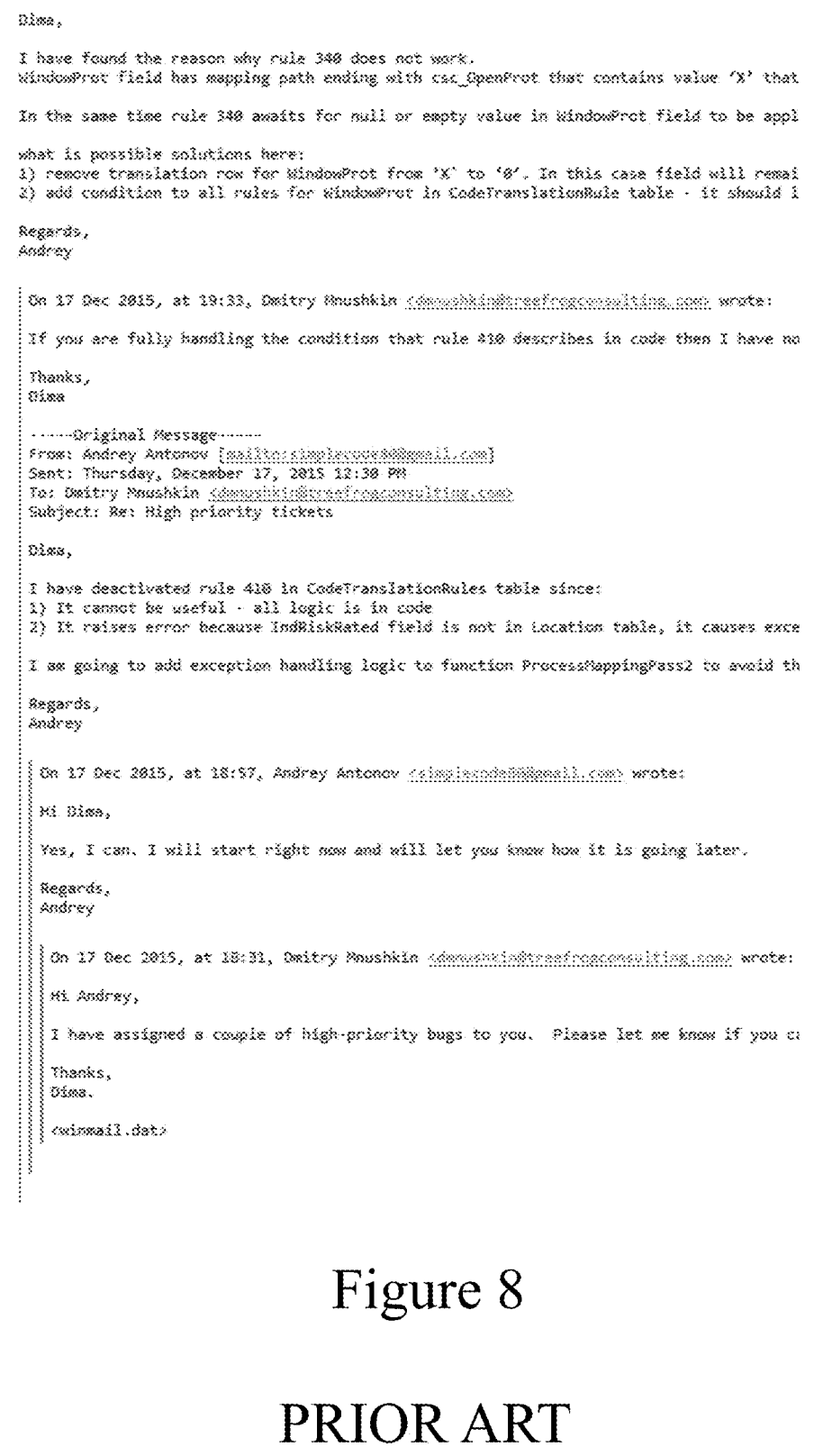

For example, an original email message would have the appearance as shown in FIG. 8 where the most current email text is shown first or at the top, then a series of horizontal color lines represents the various messages in order of transmission/receipt between senders and receivers. FIG. 9 illustrates how the present invention transforms this current email/thread structuring to give a more detailed, denotation of emails in a thread or series.

Figure 10:
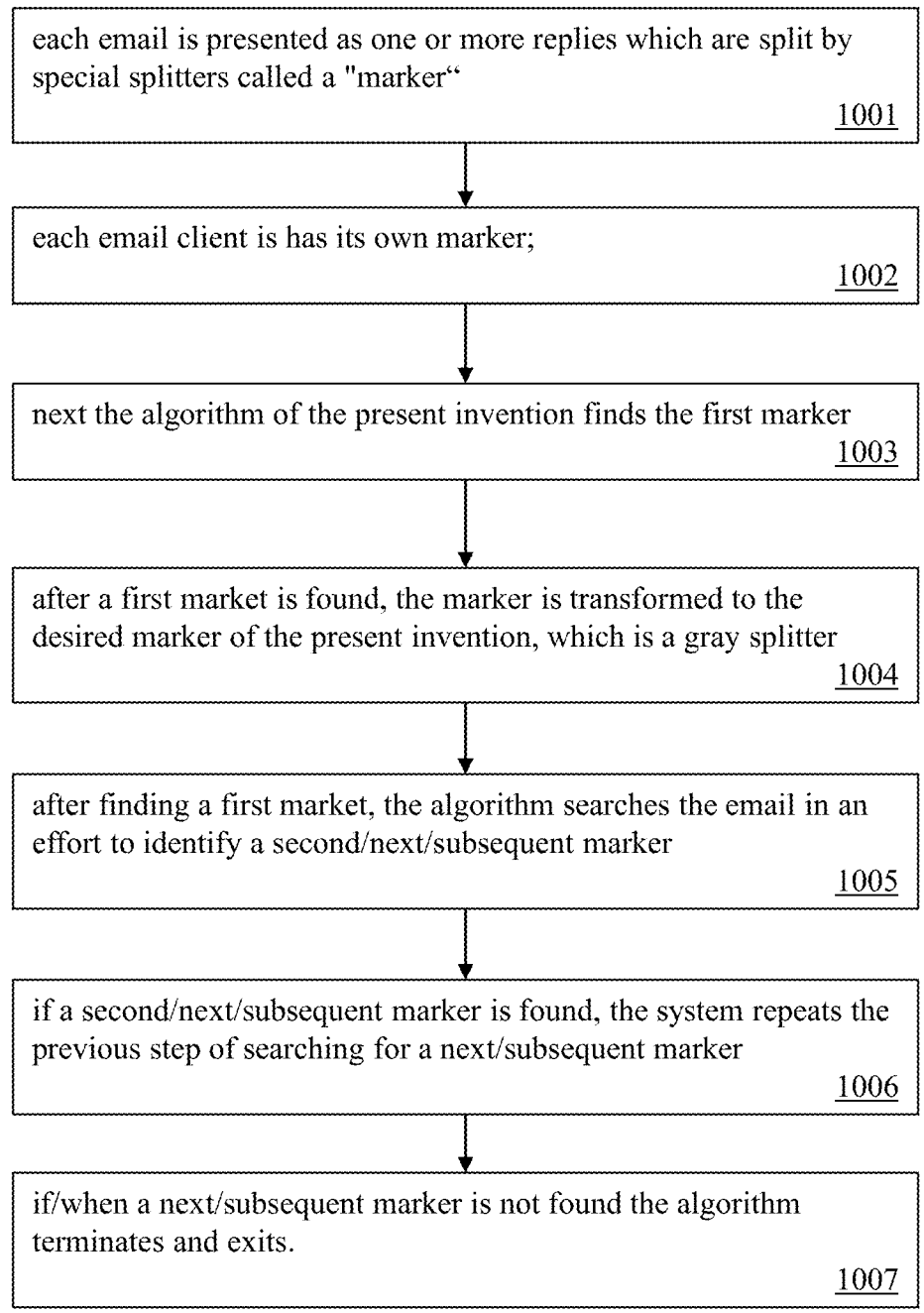
FIG. 10 is a flow chart illustrating the method and process of email transformation as taught and used by the present invention.

As shown in FIG. 9, an algorithm transforms emails based on the following rules as detailed in the flow chart of FIG. 10 where: first each email is presented as one or more replies which are split by special splitters called a "marker" 1001; next each email client has its own marker 1002; next the algorithm of the present invention finds the first marker 1003; after a first market is found, the marker is transformed to the desired marker of the present invention, which is a gray splitter 1004; after finding a first market, the algorithm searches the email in an effort to identify a second/next/subsequent marker 1005; if a second/next/subsequent marker is found, the system repeats the previous step of searching for a next/subsequent marker 1006; finally, if/when a next/subsequent marker is not found the algorithm terminates and exits 1007.

Additionally, the method of the present invention can cut or eliminate unnecessary reply to history. All messages received are considered in two possible groups: forwarded message or reply.

A forwarded message is a message that was sent for a first time or forwarded by a sender to a recipient from a 3d-party sender and recipient which does not have a history of communication between the sender and the 3d-party sender. For forwarded messages, the email transformation algorithm previous discussed is applied.

A reply is a message that was received as a reply to an original message that was sent before. An ordered list of sent messages and replies to them represents a message thread. When someone does a reply and sending, by standard email clients, the email clients traditionally send all communication history in a single email. The present invention also sends all communication history in a single email but improves on this antiquated display methodology.

The present invention cuts communication history from thread messages when displaying an email thread in right/third panel 103. This type of display control makes the thread look like a message-reply to history that other email messages clients cannot do because all email clients currently known in the prior art show all communication history in each message. The present invention selectively cuts communication history from each message and shows each message as a unique communication entity. Prior art email clients do not have this functionality or ability.

Figure 11:
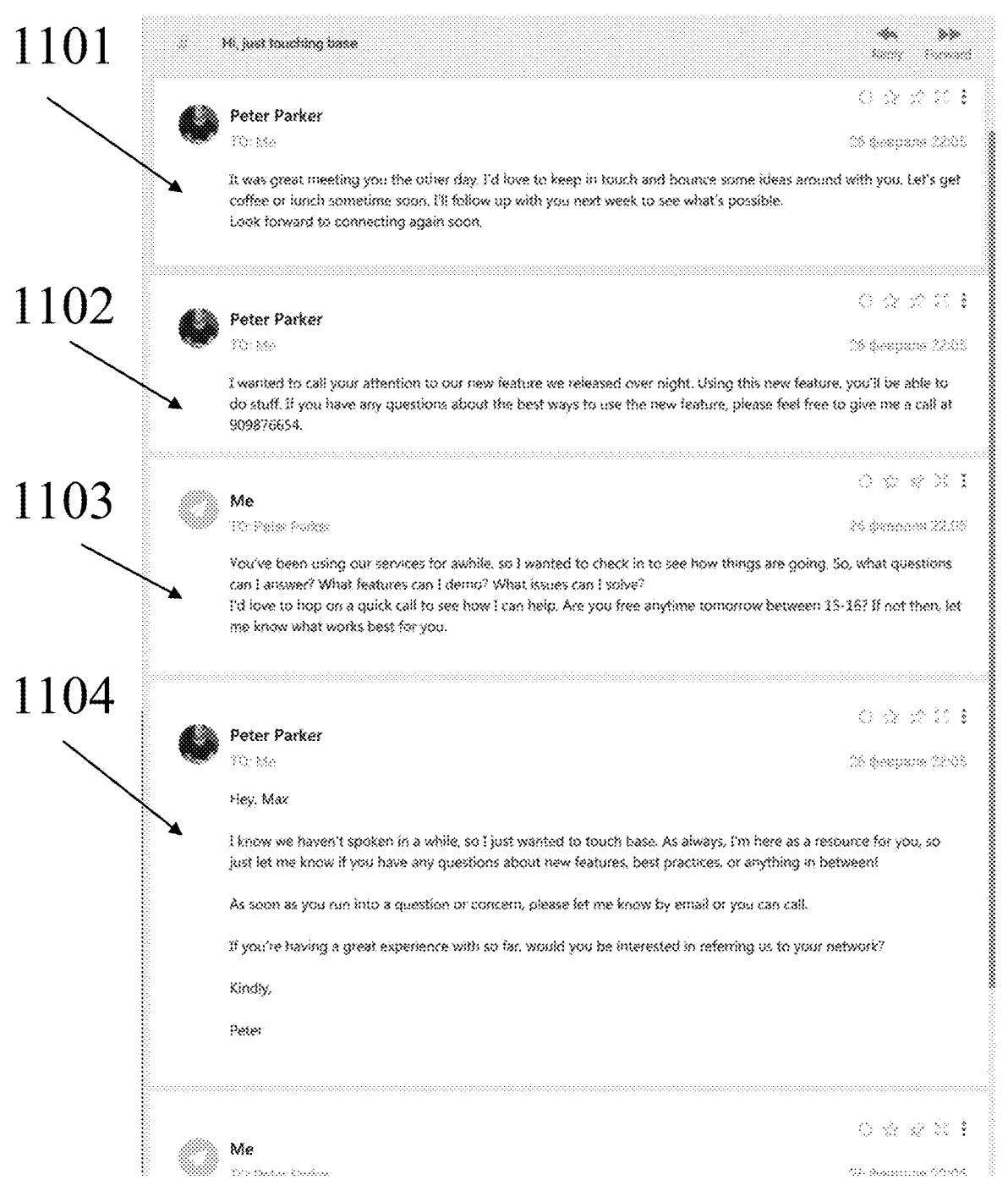
Figure 13:
FIG. 13 illustrates where each new message has a longer history and becomes less readable as displayed by current email clients know in the prior art.

FIG. 11 illustrates an example of an email thread in the right/third panel 103 of the present invention where each white block 1101, 1102, 1103, and 1104 is a unique message. FIG. 12 illustrates an example of how each unique message originally looks in other email clients known in the prior art. FIG. 13 illustrates where each new message has a longer history and becomes less readable as displayed by current email clients know in the prior art. If a thread is enough long, the thread may start to look like that as illustrated in FIG. 13, which makes sorting and locating information or discussions difficult.

Figure 14:
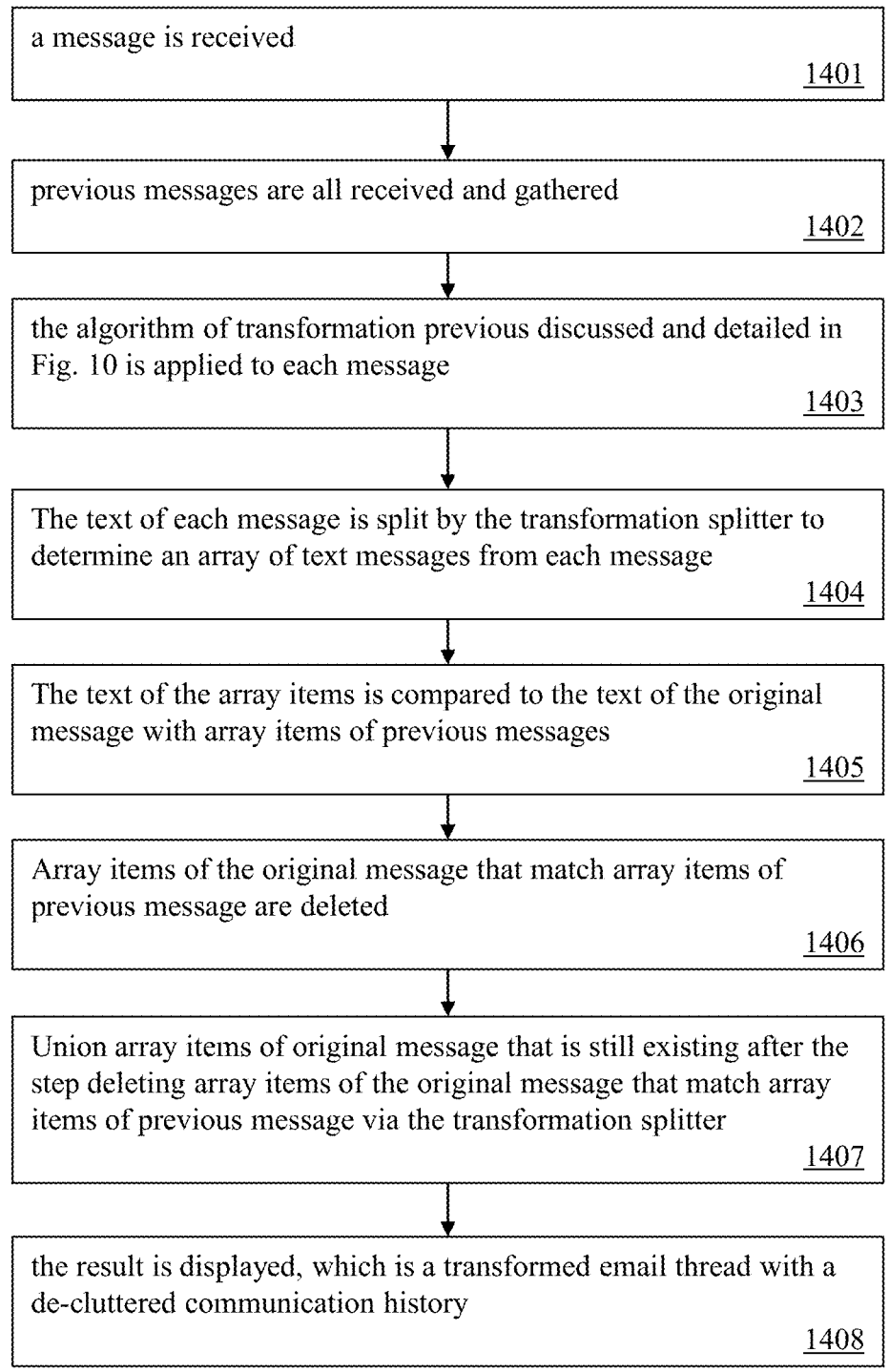
FIG. 14 is a flow chart illustrating the method and process the present invention teaches and uses to resolve display issues for email with multiple communications.
Figure 15:
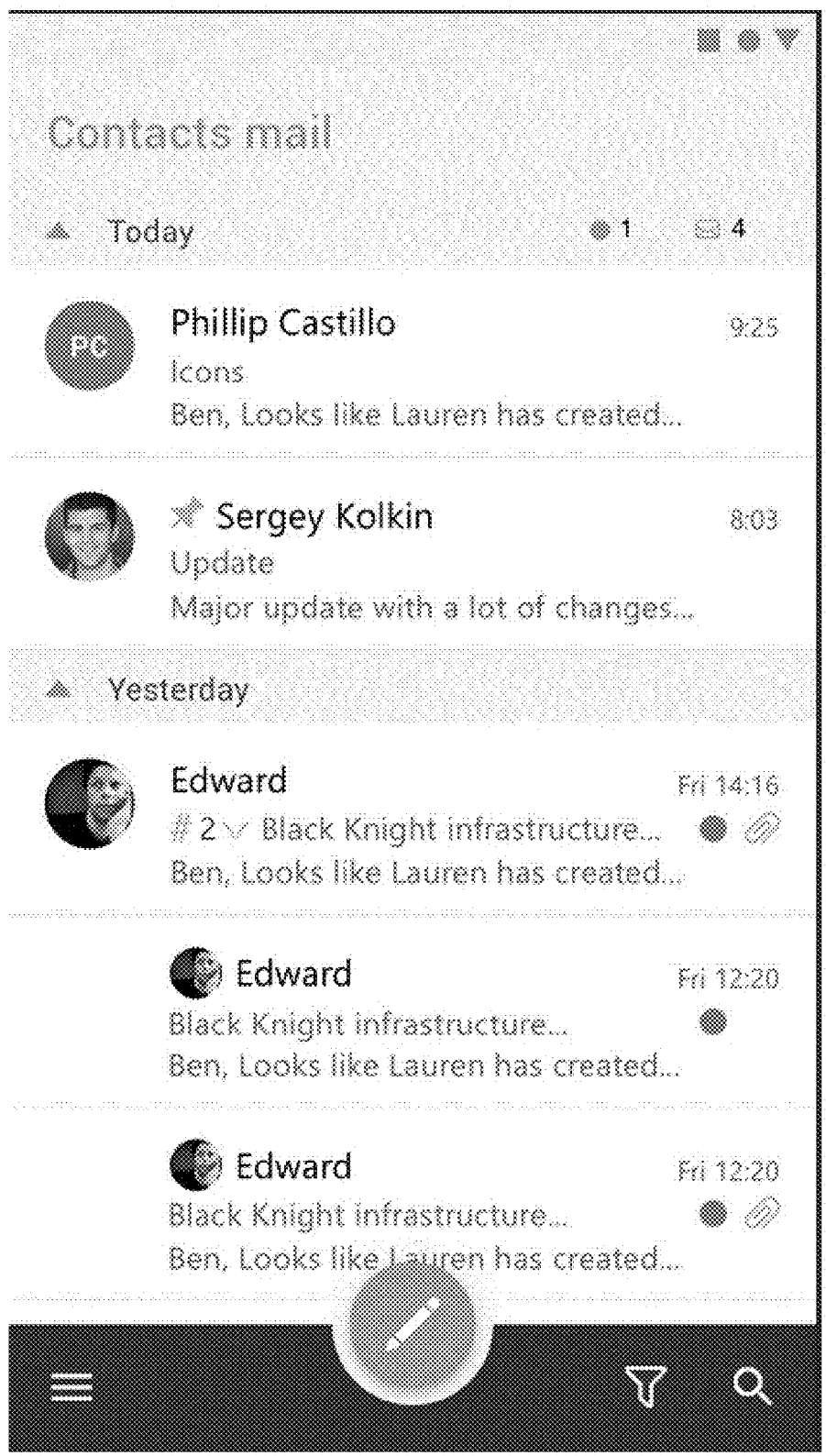
FIGS. 15-19 illustrate the present invention as displayed in a mobile phone application or in any other mobile device that does not have the display area to adequately show three panels vertically across a screen.
Figure 16:
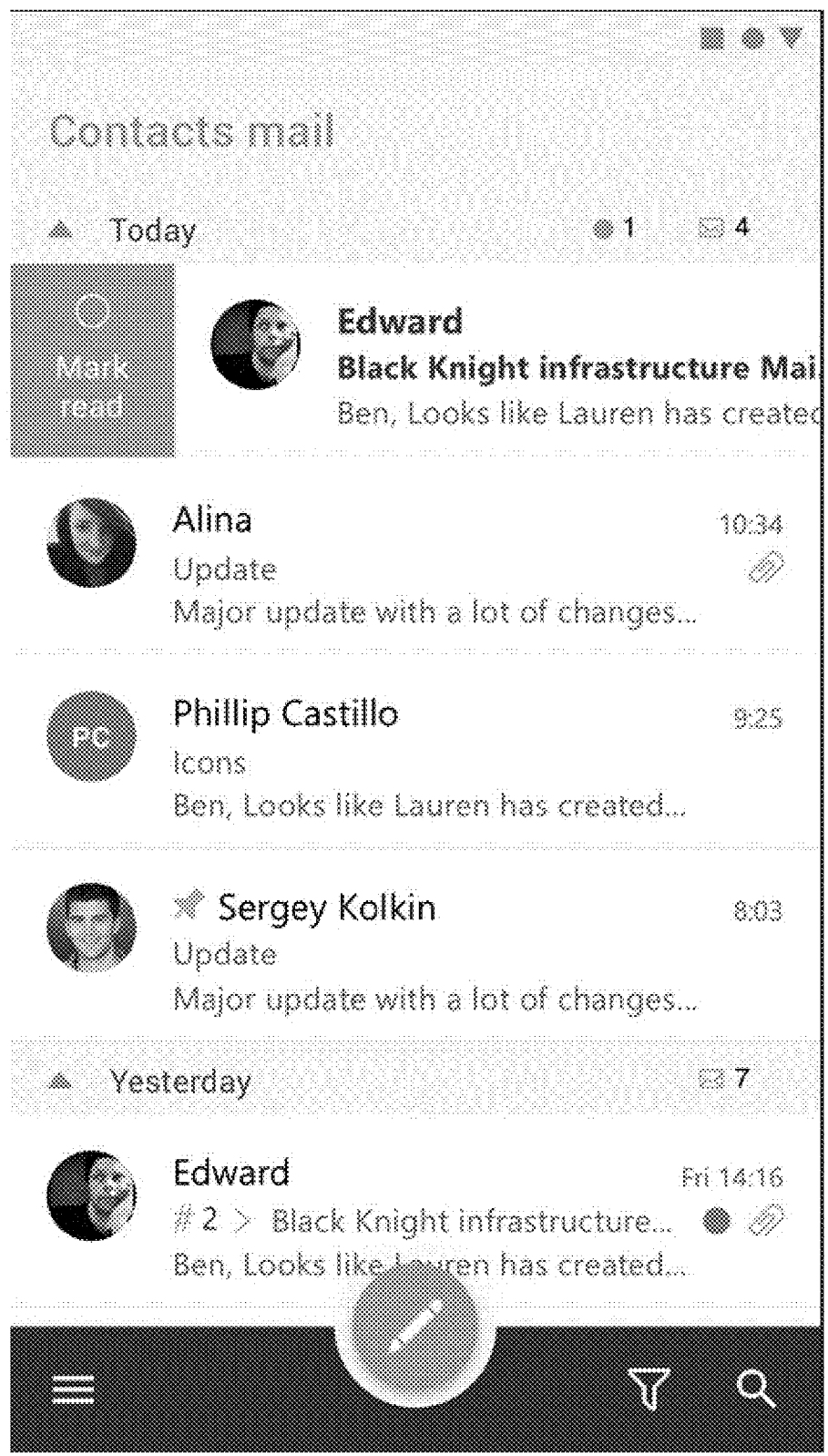
Figure 17:
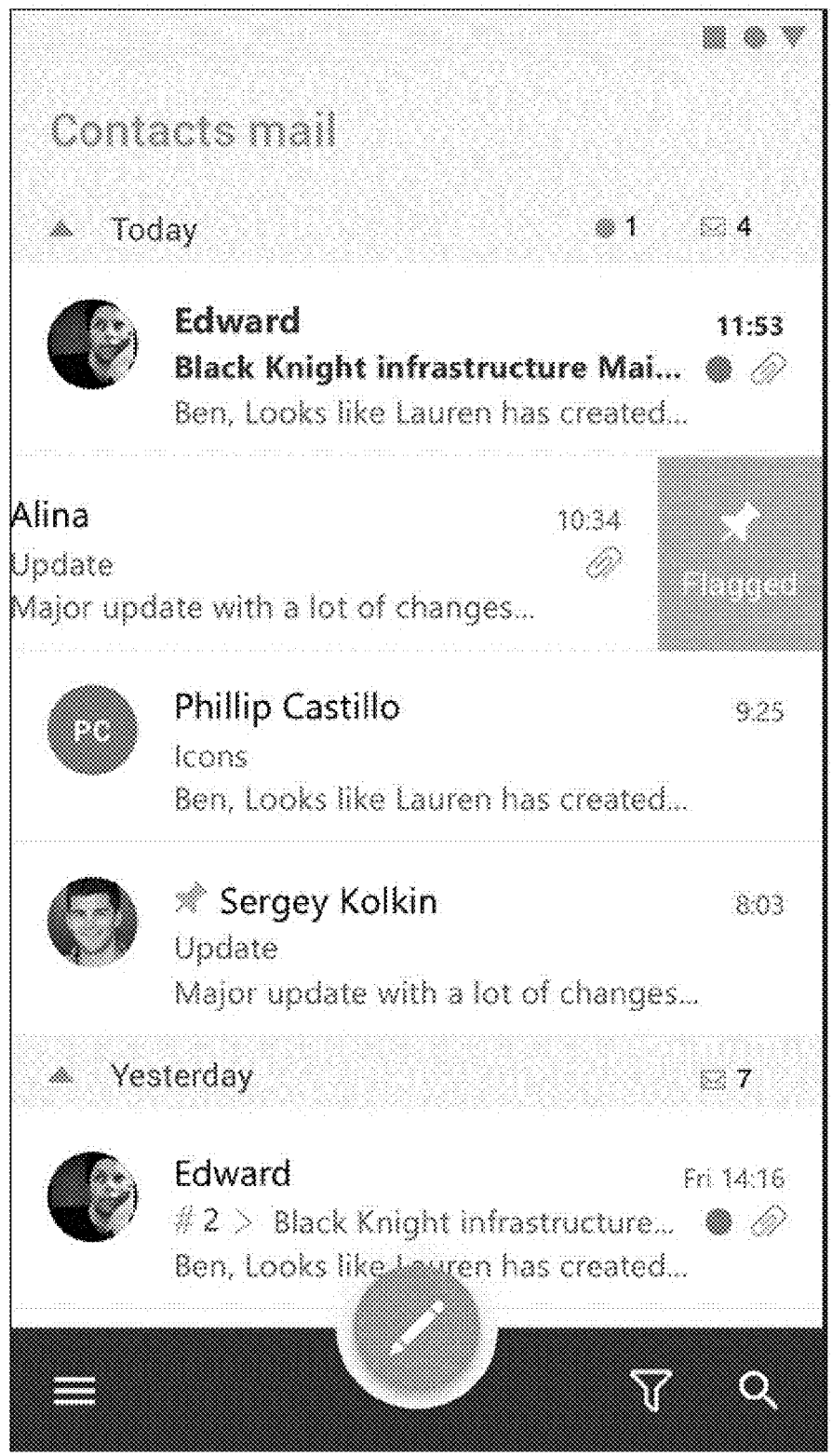
Figure 18:
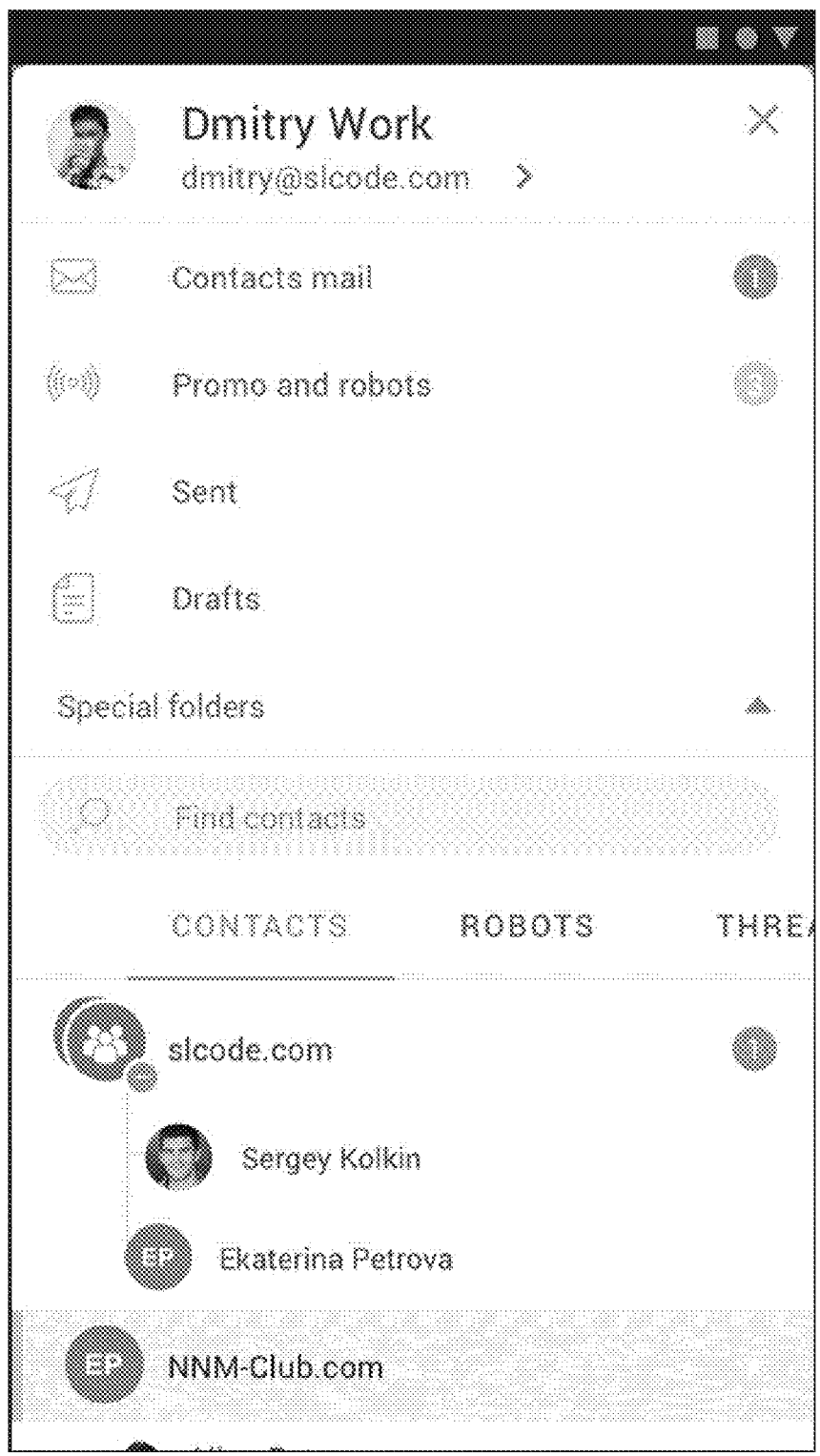
Figure 19:
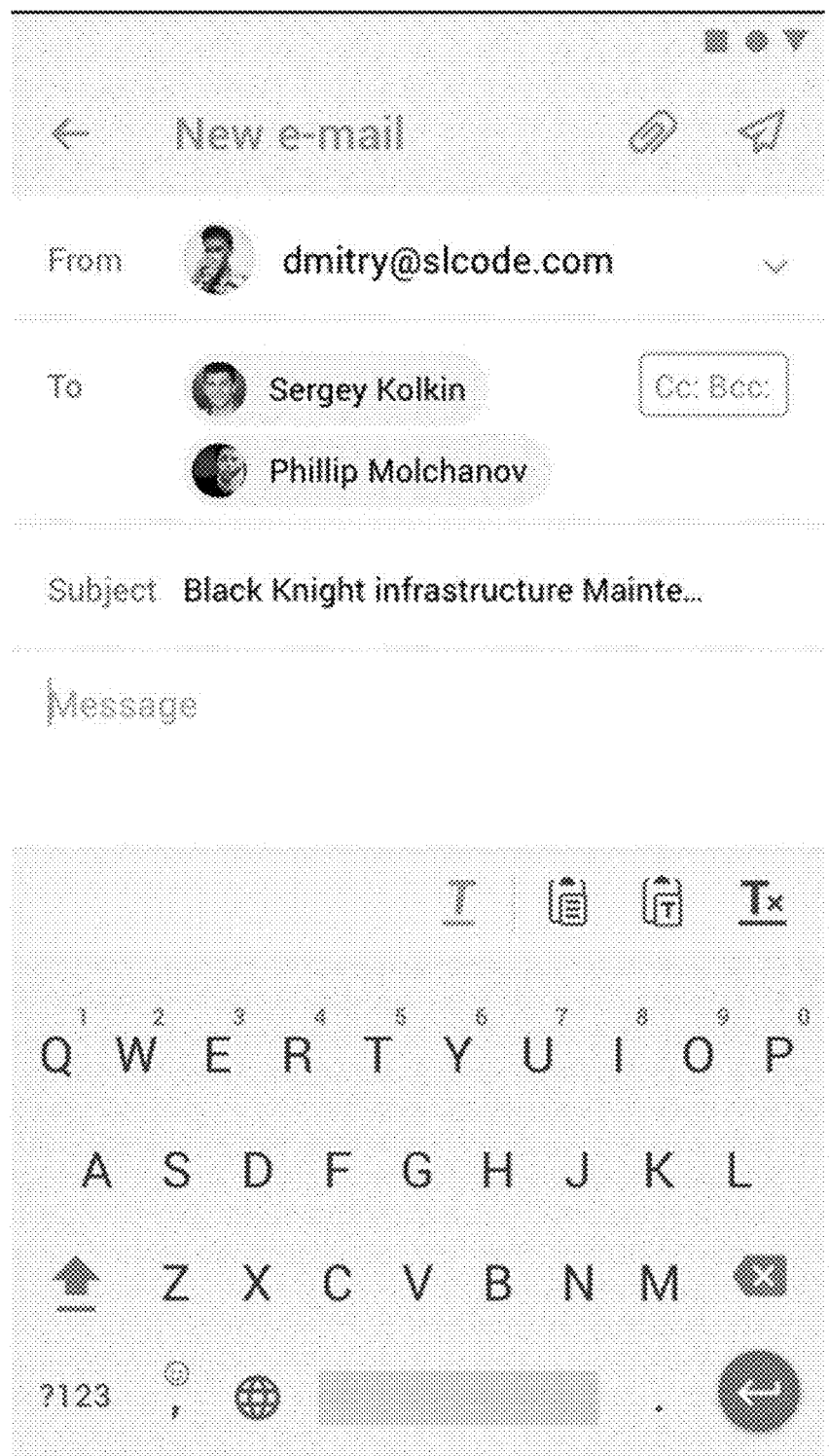

Now referring to FIG. 14, a flow chart illustrated the method and process the present invention teaches and uses to resolve this display issues for email with multiple communications. The method for cutting communication history starts when a message is received 1401. Next previous messages are all received and gathered 1402. Next, the algorithm of transformation previous discussed and detailed in FIG. 10 is applied to each message 1403. The text of each message is split by the transformation splitter to determine an array of text messages from each message 1404. The text of the array items is compared to the text of the original message with array items of previous messages 1405. Array items of the original message that match array items of previous message are deleted 1406. Union array items of original message that is still existing after the step deleting array items of the original message that match array items of previous message via the transformation splitter 1407. Finally, the result is displayed, which is a transformed email thread with a de-cluttered communication history 1408 as shown in FIG. 11.

FIGS. 15-19 illustrate the present invention as displayed in a mobile phone application or in any other mobile device that does not have the display area to adequately show three panels vertically across a screen. In this embodiment, the method and processes taught by the present invention are still used, but the panel display is altered based on screen size for mobile device viewing in comparison to the desktop viewing display of the three panel embodiment.

The mobile application of the present invention also has three panels, although they have a slightly different look than desktop version. Differences shown for the mobile version from the desktop version is that the mobile version shows only a single panel at once because the mobile screen is tight and lacks display area to adequately show all three panels, or even two panels at one time. In the mobile display embodiment of the present invention a user must switch between panels, but the panels of the desktop and mobile version have the same layout and features as disclosed.

Figure 20:
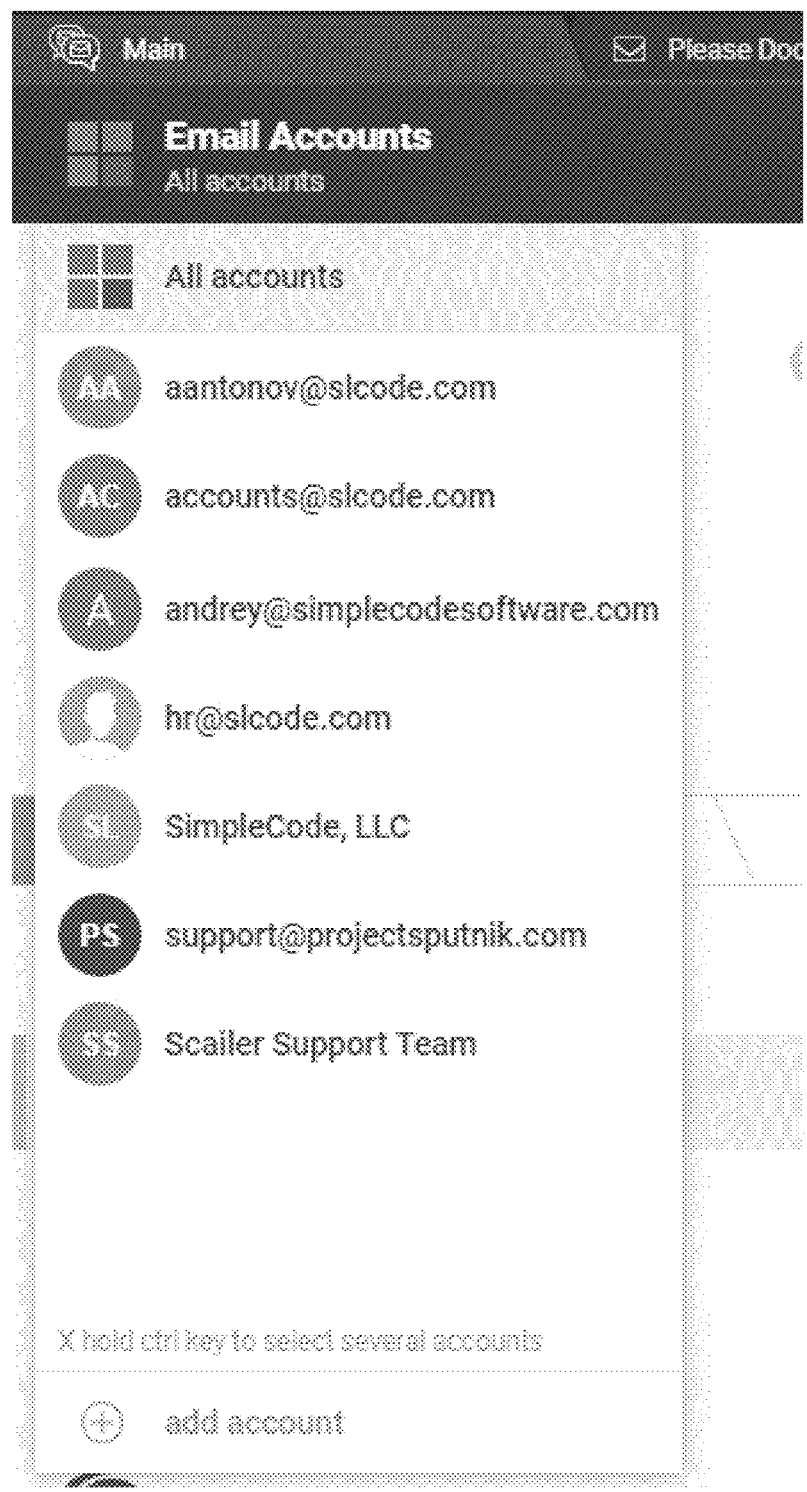
FIG. 20 is a screenshot illustrating the email account selector for the desktop application as taught by the present invention.
Figure 21:
FIG. 21 is a screenshot illustrating the email account selector for the mobile application as taught by the present invention.

In an alternative embodiment, the present invention supports multiple email accounts within one email client. While other email clients also support multiple accounts, they have no account selector. The present invention teaches a different account selector than those in the prior art which simply enable additional folders and subfolder grouping for accounts. As shown in FIG. 20 for the desktop application and FIG. 21 for the mobile application, the present invention teaches where email accounts can be selected all, single, or several (multiple). As a results of a user's selection of one or more email accounts, contacts in the left/first panel 101 and emails in middle/second panel 102 are filtered depending on the selected accounts.

The system is set to run on a computing device or mobile electronic device. A computing device or mobile electronic device on which the present invention can run would be comprised of a CPU, Hard Disk Drive, Keyboard, Monitor, CPU Main Memory, and a portion of main memory where the system resides and executes. Any general-purpose computer, smartphone, or other mobile electronic device with an appropriate amount of storage space is suitable for this purpose. Computer and mobile electronic devices like these are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A method for providing a three panel email user experience solution recorded on non-transitory computer-readable medium, executable by a machine and rendered on the display of the machine, comprising the steps of:

providing an application that is installed on a computing device for execution;

providing email software executable on a hardware platform;
the email software creating contacts and contact groups automatically the email software providing a three panel email display;
a left/first panel for displaying contacts, a middle/second panel for displaying threads/conversations; and
a right/third panel when viewed on a display screen from a user perspective scanning or viewing left to right across a display screen for displaying threads/conversations; and
the email software determining whether emails are from humans, from robots, or are important emails from robots;
wherein the left/first panel illustrates primary/contacts emails, promo and robots special folders, contacts, and contact groups;
grouping emails without considering "date" as one of the primary grouping criteria;
the left/first panel also includes themes;
clicking or selecting a "#" symbol in the right/third panel;
adding a particular theme to left/first panel for quick access;
creating a particular theme for left/first panel for quick access where the left/first panel displaying categories represented by a four dots square;
the left/first panel displaying categories, represented by a four dots square;
different contacts and groups are displayed in the same left panel at the same time without switching its mode which is accomplished by the four dots square;
creating a category;
the four dot square on the left panel provides for switching a left panel view to displaying categories;
in order to set or clear category of the message, selecting a circle on the middle panel or the right panel; and
marking any email with a category.

2. The method of claim 1, wherein a contacts mail inbox or folder is presented in the left/first panel to assist in organization and sorting for a user and the user's experience.

3. The method of claim 2, wherein
primary emails are those emails received by a "contact", which is an email sender that is already known to the recipient/user and emails sent by a "contact" are highly likely to be an email the user wants to view, read, and respond to as emails sent by a "contact" have importance and value to the user; and
setting rules automatically by a email client program.

4. The method of claim 1, further comprising a promotion and robot main folder which identifies and groups robot emailers as promotions emails;
removing such clutter from the contacts email and separating promotion and robot emails from contact emails automatically for the user; and
the promotion and robots folder collects and shows all promo emails and emails from robots.

5. The method of claim 4, wherein
primary/contacts emails email shows all emails from contacts and some important notifications from robots.

6. The method of claim 1, further comprising standard email folders for sent emails and draft emails.

7. The method of claim 1, further comprising one or more special folders for grouping emails based on various topics.

8. The method of claim 1, wherein
contacts are retrieved from email conversations:
a contacts list is created by selecting all sender and recipient email address from all emails loaded into the program from a remote email server or one or more linked email accounts;
contacts groups are created automatically from conversations and domains by special private algorithm;
contacts and groups are automatically sorted going on top of the list when new email arrived to the contact and group is received/sent; and
when a contact is selected from the contacts list, emails received from, and emails sent to that contact are loaded as a list in the middle/second panel for review.

9. The method of claim 1, further comprising a robots tab for identifying contacts that are determined to be robots which send promotions or mass marketing type emails.

10. The method of claim 1, wherein one or more custom groups are created;
custom groups are color coded and named for custom appearance and application; and
the order of application for custom categories are manipulated for appearance purposed in the left/first panel where emails received the contacts listed or as part of a custom group are loaded as a list in the middle/second panel for review.

11. The method of claim 1, wherein
the middle/second panel shows all conversation emails received and sent as related to the item selected in left/first panel;
simultaneous displaying both send and received mail items;
the middle/second panel has the ability to show all email received and sent without grouping them; and
the middle/second panel can group and show email groups while also allowing emails to expand/collapse into groups.

12. The method of claim 11, wherein
upon selection of a left/first panel item, the selection is received by the second panel and the second panel is sent and received emails grouped by data or theme for the selected left/first panel item and then displayed in the middle/second panel; and
the left/first panel and the second panel provide for the simultaneous display of the received and sent emails.

13. The method of claim 12, wherein
messages are sorted and/or grouped by:
priority status;
ready/unread;
from/to; theme;
no category,
attachments, attachment size, date, and
priority/pinning, and whether the messages are flagged or not flagged using a plurality of horizontally placed button controls located along the top header of the middle/second panel.

14. The method of claim 12, further comprising
a collapse/expand button located at the end of the tool bar also provides the user the ability to expand and collapse emails by: contact, theme, category; attachment size ranges/groups and no attachment groups; day, showing the total number of emails each day as well as the number of emails for each contact by displaying a number next to a colored circle corresponding to a specific contact for each selected sorting feature provided in the horizontal tool bar.

15. The method of claim 14, wherein
when grouped by theme, messages are expanded or collapsed and show related thread messages.

16. The method of claim 1, wherein
the right/third panel shows a message thread defined as an ordered set of related emails, related to the email selected in the middle panel; and
the right/third panel shows both received and sent emails like the middle panel.

17. The method of claim 1, further comprising
a main horizontal header and toolbar is presented to the user via the display;
the main horizontal header/toolbar provides selectable buttons for creating
a new email,
sorting the middle/second panels list of emails by the emails that
have been "only read",
have attachments,
have one or a one or more customized categories, and
have been flagged or flagged in combination with one or more of the other filters selected, the other filters being "only read", with attachments, and categories, by period broken down by day, week, month, year, and selectable dates, as well as sent, received and all message types.

18. The method of claim 1, further comprising
an algorithm for distinguishing important messages by special algorithm that value message text, not user subscription;
applying the algorithm to each email when received in order to distinguish human emails from robot emails;
contacts are automatically grouped into groups by using the algorithm;
applying the algorithm to each email when received in order to distinguish important robot emails from generic robot emails;
the algorithm analyzing the text of an email, words in the email, sentences in the email, phrases in the email; and
based on findings, the algorithm making a decision whether the analyzed email is from a human or robot, and
making a determination if the analyzed email is an important email from a robot that should be displayed to a user; and
displaying different contacts and groups in the same left panel at the same time without switching a panel mode.

19. The method of claim 18, wherein the algorithm is further comprised of the following steps
the algorithm recognizes well-known robot email sender addresses;
the algorithm recognizes well-known robot names;
the algorithm conducts a text analysis searching for specific words, sentences, and phrases that are indicators that an email is a robot email; and
the algorithm classifies an email as a robot email or a human email.

20. The method of claim 1, further comprising
an advanced search window;
the advanced search window providing advanced searching of one or more messages; and
advanced searching is performed by searching text, limiting a text search to the subject, body, attachments, and any combination thereof, as well as one or more email accounts and sender and recipients over a date range, and further narrowing to those received, flagged, sent, having attachments, drafts, marked as important, unread, and an excluding periodic.

* * * * *